UNITED STATES PATENT OFFICE.

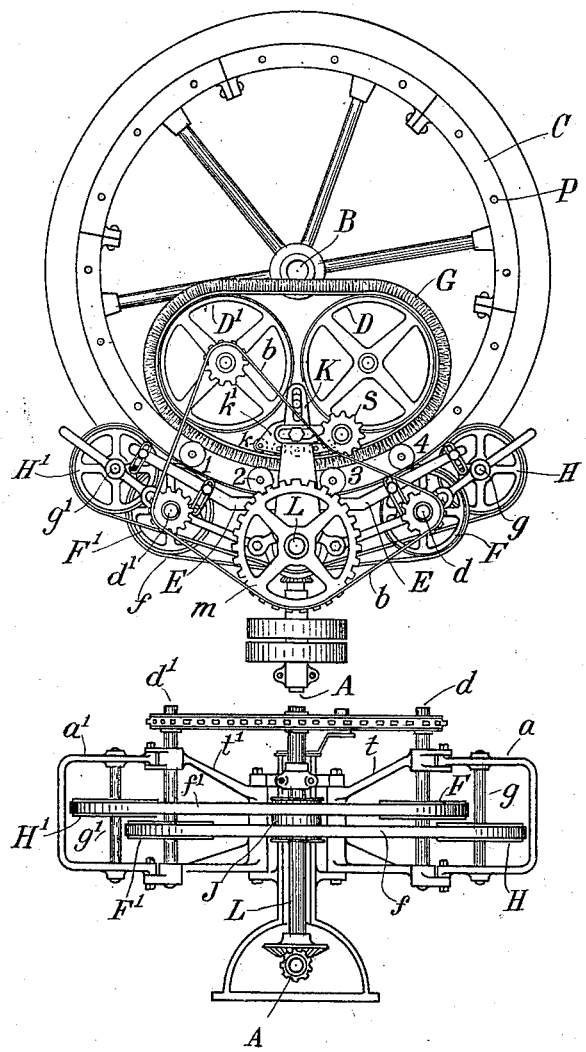
C. HAMANN.
BOTTLE WASHER.
APPLICATION FILED NOV. 22, 1912.
1,068,648.
Patented July 29, 1913.

CHARLES HAMANN, OF NEW YORK, N. Y.

BOTTLE-WASHER.

1,068,648.  Specification of Letters Patent.  Patented July 29, 1913.

Application filed November 22, 1912. Serial No. 732,949.

*To all whom it may concern:*

Be it known that I, CHARLES HAMANN, a citizen of the United States, residing at New York city, borough of Brooklyn, county of Kings, State of New York, have invented certain new and useful Improvements in Bottle-Washers, the following being a full, clear, and exact disclosure of the one form of my invention which I at present deem preferable.

For a detailed description of the present form of my invention, reference, may be had to the following specification and accompanying drawings forming a part thereof, in which—

Figure 1 is a plan of my device and Fig. 2 a side elevation thereof.

My invention relates to certain improvements on the apparatus shown in the patent of Charles W. Hamann, No. 995,596, dated June 20th, 1911, and consists in means for largely increasing the period in the rotation of the bottle carrier, wherein the bottles are rotated and scrubbed. Specifically I provide double overlapping and parallel belts for rotating the bottles and in conjunction therewith a scrubber consisting of an endless belt furnished with bristles and passing over two pulleys and over guide rollers so as to bring the belt into the arc of travel of the bottles.

Referring to the drawing, C represents a horizontal rotating table or carrier for the inverted bottles with pins P for receiving them, the bottles being cleansed internally by any desired means, such, for instance, as those shown in the aforesaid Patent No. 995,596. The table or carrier C is operated in any desired way from the main driving shaft A. Mounted above the said table or carrier are two horizontal pulleys D and $D^1$ around the peripheries of which is an endless brush-belt G. One side of this belt is distended by means of a guide comprising a series of rollers $k$ mounted, in an arc concentric with the table or carrier C, on a bearing plate $k^1$ adjustable along a bracket K. By this arrangement the brush belt travels over an arc concentric with the table or carrier for a space of approximately 90 degrees and the bottles, as they revolve with the table or carrier are for that length of space in contact with the brush-belt and are scrubbed thereby. In Fig. 1 four bottles 1, 2, 3 and 4 are shown as being simultaneously in engagement with the brush-belt G.

Outside of the table or carrier C is a vertical shaft L and a sprocket wheel $m$ on the upper end of the shaft acts to drive one of the pulleys D, $D^1$ by means of a belt $b$ passing over a tightening sprocket-wheel $s$. On either side of shaft L are two wing-frames $t$ and $t^1$ mounted on a vertical axis so as to be capable of swinging to or from the table or carrier. In the outer ends of the said wing-frames are journaled the respective vertical shafts $d$ and $d^1$ which are also rotated by the belt $b$. On shaft $d$ is a pulley F and on shaft $d^1$ is a similar pulley $F^1$. Secondary wing-frames $a$ and $a^1$ are jointed to the outer ends of the respective wing-frames $t$, $t^1$ and carry respectively the vertical shafts $g$ and $g^1$, the former provided with a pulley H and the latter with a pulley $H^1$. Each of the four wing-frames is separately adjustable to or from the table or carrier by links and set-screws engaging the fixed rail E. Over the pulleys F and $H^1$ runs a belt $f^1$ and a similar parallel belt $f$ runs over pulleys $F^1$ and H. These belts on one side bear against the four bottles 1, 2, 3 and 4 and on the other side they pass over a drive-pulley J on shaft L. The purpose of these belts $f$ and $f^1$ is to keep the bottles which are in contact with them in rotation against the brush-belt G. By my arrangement of them the belts overlap each other and are enabled to cover a longer arc on the table or carrier C without becoming slack than was possible with the single-belt arrangement of the Hamann patent mentioned above. Each belt constitutes a belt-section covering a different arc of the carrier or a different portion of the entire arc covered by the two considered as a whole and they are driven in the same direction adjacent to the line of travel of the bottles on the carrier.

What I claim as new and desire to secure by Letters Patent is:

1. In a bottle-washer, a rotating carrier for the bottles, a brush-belt traveling in an arc concentric with the carrier and positioned to contact with the bottles on the carrier, and means for rotating the bottles upon their longitudinal axes while in contact with said brush-belt.

2. In a bottle-washer, a rotating carrier for the bottles, a brush-belt positioned to contact with the bottles on the carrier, a guide for said brush-belt concentric with the carrier, and means for rotating the bottles upon their longitudinal axes while in contact with said brush-belt.

3. In a bottle-washer, a rotating carrier for the bottles, a brush-belt positioned to contact with the bottles on the carrier and pulleys therefor, a guide for said brush-belt comprising a series of rollers arranged concentrically with the carrier, and means for rotating the bottles upon their longitudinal axes while in contact with said brush-belt.

4. In a bottle-washer, a rotating carrier for the bottles, a set of overlapping belts in contact with the bottles, means for washing the bottles while on the carrier, and means for driving the belts in the same direction.

5. In a bottle-washer, a rotating carrier for the bottles, two overlapping belts covering an arc of the carrier, means for washing the bottles while on the carrier and pulleys for the belts adjustable to and from the carrier.

6. In a bottle-washer, a rotating carrier for the bottles, two parallel belts covering an arc of the carrier, adjacent to the line of travel of the bottles on the carrier, means for washing the bottles while on the carrier and means for driving the belts in the same direction.

7. In a bottle-washer, a rotating carrier for the bottles, means for washing the bottles while on the carrier, belt-sections adjacent to the line of travel of the bottles on the carrier but covering different arcs and driving means therefor.

8. In a bottle-washer, a rotating carrier for the bottles, means for washing the bottles while on the carrier, belts adjacent to the line of travel of the bottles on the carrier and four pulleys for the belts mounted in bearings adjustable to and from the carrier.

In witness whereof I have hereunto set my hand, before two subscribing witnesses, this twenty-first day of November, 1912.

CHARLES HAMANN.

Witnesses:
L. T. S. ERISMAN,
WALLACE C. DECKER.

---

Copies of this patent may be obtained for five cents each, by addressing the "Commissioner of Patents, Washington, D. C."